US010703854B2

(12) United States Patent
Warren et al.

(10) Patent No.: US 10,703,854 B2
(45) Date of Patent: Jul. 7, 2020

(54) EPOXY FORMULA FOR INTEGRAL CAPACITANCE PROBE

(71) Applicant: United Technologies Corporation, Farmington, CT (US)

(72) Inventors: Eli Cole Warren, Wethersfield, CT (US); Peter J. Walsh, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 157 days.

(21) Appl. No.: 15/909,280

(22) Filed: Mar. 1, 2018

(65) Prior Publication Data

US 2019/0169355 A1 Jun. 6, 2019

Related U.S. Application Data

(63) Continuation-in-part of application No. 15/832,184, filed on Dec. 5, 2017, now Pat. No. 10,371,497.

(51) Int. Cl.
| | |
|---|---|
| B32B 27/38 | (2006.01) |
| C08L 63/00 | (2006.01) |
| C08G 59/22 | (2006.01) |
| C08G 59/24 | (2006.01) |
| C08G 59/30 | (2006.01) |
| C08G 59/44 | (2006.01) |
| C08G 59/50 | (2006.01) |
| C08G 59/06 | (2006.01) |
| C08G 59/32 | (2006.01) |
| C08G 59/64 | (2006.01) |
| G01B 7/14 | (2006.01) |

(52) U.S. Cl.
CPC ............. C08G 59/06 (2013.01); C08G 59/32 (2013.01); C08G 59/64 (2013.01); C08L 63/00 (2013.01); G01B 7/14 (2013.01); C08J 2363/10 (2013.01); F05D 2270/80 (2013.01)

(58) Field of Classification Search
CPC ...... C08L 63/00; C09D 163/00; C09J 163/00; C08G 59/22; C08G 59/223; C08G 59/226; C08G 59/24; C08G 59/245; C08G 59/30; C08G 59/308; C08G 59/44; C08G 59/50; C08G 59/5026; B32B 27/38
USPC ....... 523/427, 428, 433, 445, 457, 458, 466, 523/468; 428/413
See application file for complete search history.

(56) References Cited

U.S. PATENT DOCUMENTS

| | | | |
|---|---|---|---|
| 9,550,911 B2 | 1/2017 | Wohl | |
| 9,574,045 B2 | 2/2017 | Yamada et al. | |
| 10,371,497 B2 * | 8/2019 | Warren | .................. F01D 11/14 |
| 2008/0055011 A1 * | 3/2008 | Kasahara | .................. H03L 1/04 |
| | | | 331/70 |
| 2016/0169009 A1 | 6/2016 | Okamoto et al. | |
| 2016/0195411 A1 | 7/2016 | Ford et al. | |
| 2017/0210951 A1 | 7/2017 | Abe et al. | |
| 2018/0079710 A1 * | 3/2018 | Kasemi | ................. C07C 215/50 |

FOREIGN PATENT DOCUMENTS

| | | | | |
|---|---|---|---|---|
| JP | 2013155336 A | * | 8/2013 | ............. C08G 59/06 |
| WO | WO-2016151006 A1 | * | 9/2016 | ............ C07C 215/50 |

OTHER PUBLICATIONS

Machine translation of JP-2013155336-A (no date).*

* cited by examiner

Primary Examiner — Michael J Feely
(74) Attorney, Agent, or Firm — Snell & Wilmer, L.L.P.

(57) ABSTRACT

An epoxy composition may comprise a resin composition comprising a diglycidyl ether of bisphenol AF and at least one of a filler, a fire resistant component, a chain extender, a conductivity modifier, and a dye. The resin composition may further comprise at least one diglycidyl ether of bisphenol A and bisphenol F.

17 Claims, 10 Drawing Sheets

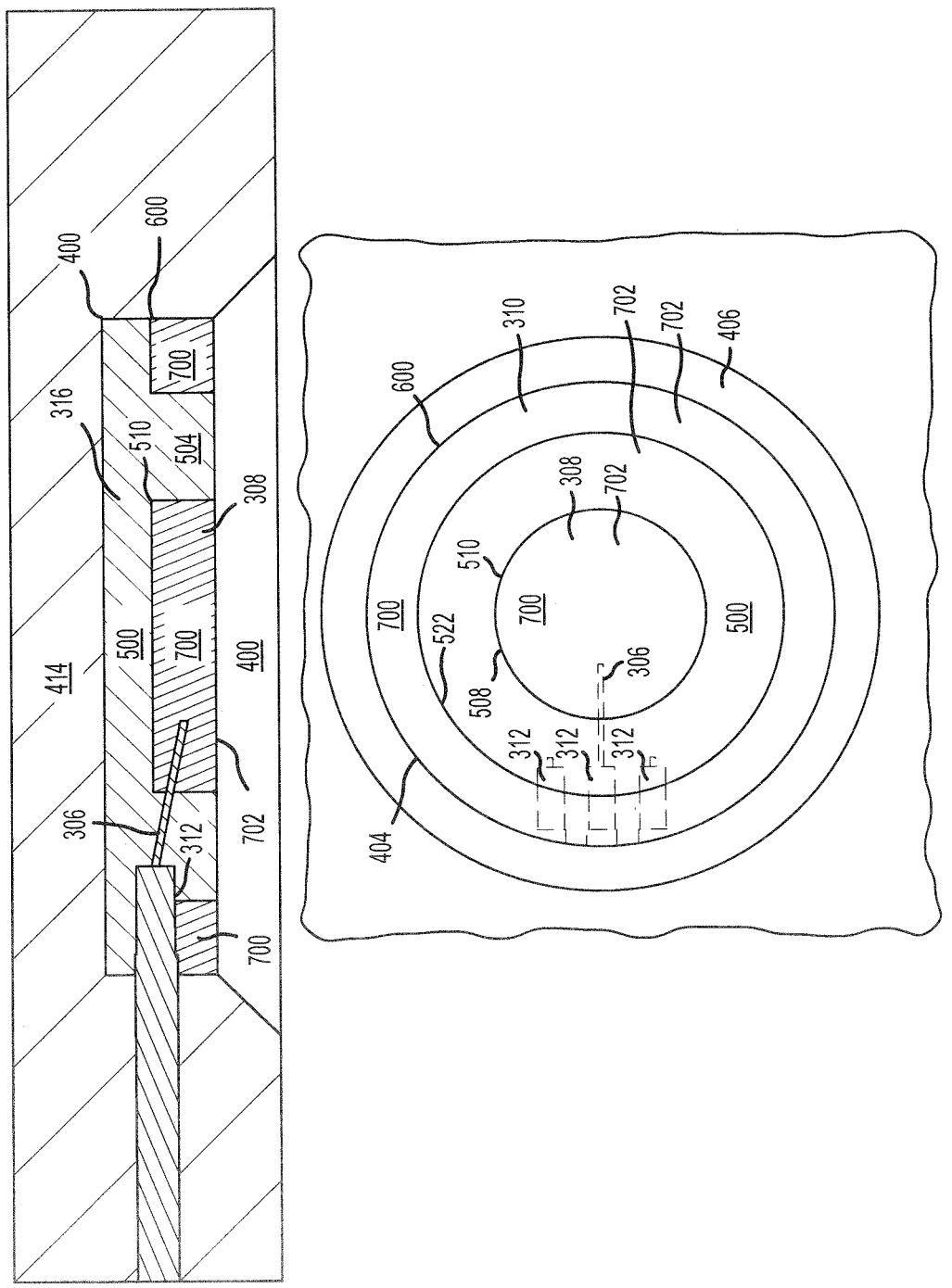

EPOXY FORMULA FOR INTEGRAL CAPACITANCE PROBE

CROSS REFERENCE TO RELATED APPLICATIONS

This application is a continuation-in-part of U.S. Ser. No. 15/832,184 filed on Dec. 5, 2017 and entitled "FULLY INTEGRAL EPOXY CAP PROBE". The foregoing application is hereby incorporated by reference in its entirety for all purposes.

FIELD

The disclosure relates generally to epoxy formulas for structural epoxies.

BACKGROUND

Gas turbine engine efficiency is directly related to the level of control of the gap between the blade tip and the outer air seal. In various embodiments, a capacitance-based BTC probe (cap probe) may be placed in the outer air seal to monitor this gap. Traditional cap probes and cap probe installations tend to alter engine structures comprising the outer air seal, tending thereby to alter the air seal and tending to reduce engine efficiency. Traditional cap probe construction materials tend to contribute to the alteration of the air seal due, in part, to material thickness.

SUMMARY

In various embodiments the present disclosure provides an epoxy composition comprising a resin composition comprising a diglycidyl ether of bisphenol AF, "bisphenol AF" and at least one of a filler, a fire resistant component, a chain extender, a conductivity modifier, and a dye.

In various embodiments, the resin composition further comprises at least one diglycidyl ether of bisphenol A and bisphenol F, "bisphenol A" and "bisphenol F". In various embodiments, the resin composition comprises a mixture of bisphenol AF with bisphenol A at a mixture ratio of between 10% to 90%. In various embodiments, the resin composition comprises a mixture of bisphenol AF with bisphenol F at a mixture ratio of between 10% to 90%. In various embodiments, the resin composition comprises between 15% and 25% by weight of at least one of bisphenol A or bisphenol F, between 10% and 20% by weight of Alkyl(C12-14) glycidyl ether, and between 65% and 70% of bisphenol AF. In various embodiments, the conductivity modifier comprises at least one of carbon black, graphite flakes, nano powders of: silver, nickel, copper, or aluminum, micro powders of: silver, nickel, copper, or aluminum, or whiskers of: silver, nickel, copper, or aluminum. In various embodiments, the filler comprises at least one of a non-conductive filler composition comprising one of (SiO2) Silica microparticles, silica nanoparticles, silica flakes or silica whiskers, (Al2O3) Alumina micropoarticles, alumina nanoparticles, alumina flakes or alumina whiskers, (SiO4) Quartz microparticles, quartz nanoparticles, quartz flakes or quartz whiskers, Titania microparticles, titania nanoparticles, titania flakes or Titania whiskers, (BN) Boron nitride platelets, boron nitride flakes, Boron nitride nanomesh, and agglomerations of boron nitride platelets, flakes or nanomesh, (AlN)Aluminum nitride micro particles, nanoparticles, flakes or platelets, silica glass bubbles, glass micro fibers, or ground mica micro platelets or nano platelets. In various embodiments, the fire resistant component comprises any of brominated aliphatic polyol polyepoxy resin, Tetrabromobisphenol A epoxy resin, Brominated neo pentyl glycol epoxy resin at a weight percent of less than about 30% of weight the fire resistant component to weight the resin composition. In various embodiments, the chain extender comprises antimony trioxide at about 1% to about 10% of weight Antimony trioxide to weight the resin composition. In various embodiments, the epoxy composition comprises between 40% and 70% by weight of the resin composition, between 10% and 30% by weight of the filler, between 10% and 30% by weight of the fire resistant component, between 1% and 5% of the chain extender, and less than 0.1% by weight dye or trace reaction products. In various embodiments, the epoxy composition comprises between 40% and 70% by weight of the resin composition, between 0% and 30% by weight of the filler, between 10% and 30% by weight of the conductivity modifier, between 10% and 30% by weight of the fire resistant component, between 1% and 5% of the chain extender, and less than 0.1% by weight dye or trace reaction products. In various embodiments, the epoxy composition comprises a curative comprising at least one of an amine curative, a cycloaliphatic polyamine, a polyamide, or an amino amine.

In various embodiments, the present disclosure provides an article comprising a frame structure having a frame material having a first epoxy composition, and a sensor element disposed within the frame structure comprising a second epoxy composition, wherein the first epoxy composition and the second epoxy composition each comprise a resin composition comprising bisphenol AF and at least one of a filler, a fire resistant component, a chain extender, a conductivity modifier, and a dye.

In various embodiments, wherein the resin composition further comprises at least one of bisphenol A and bisphenol F. In various embodiments, the resin composition comprises between 15% and 25% by weight of at least one of bisphenol A or bisphenol F, between 10% and 20% by weight of Alkyl(C12-14) glycidyl ether, and between 65% and 70% of bisphenol AF. In various embodiments, the first epoxy composition comprises between 40% and 70% by weight of the resin composition, between 10% and 30% by weight of the filler, between 10% and 30% by weight of the fire resistant component, between 1% and 5% of the chain extender, and less than 0.1% by weight dye or trace reaction products. In various embodiments, the second epoxy composition comprises between 40% and 70% by weight of the resin composition, between 0% and 30% by weight of the filler, between 10% and 30% by weight of the conductivity modifier, between 10% and 30% by weight of the fire resistant component, between 1% and 5% of the chain extender, and less than 0.1% by weight dye or trace reaction products. In various embodiments, the second epoxy composition a resistivity not more than $10^{-7}$ Ohm-m when combined with a curative. In various embodiments, the first epoxy composition has a dielectric strength greater than 26.6 kV/mm, a volume resistivity at room temperature greater than $10^{14}$ Ohm-cm and greater than $10^{11}$ at 570° F., and a dielectric constant at room temperature and 8500 MHz of 9±5 when combined with a curative. In various embodiments, the first epoxy composition and the second epoxy composition have a porosity of zero when combined with a curative.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 7 illustrates a fully integral epoxy cap probe, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
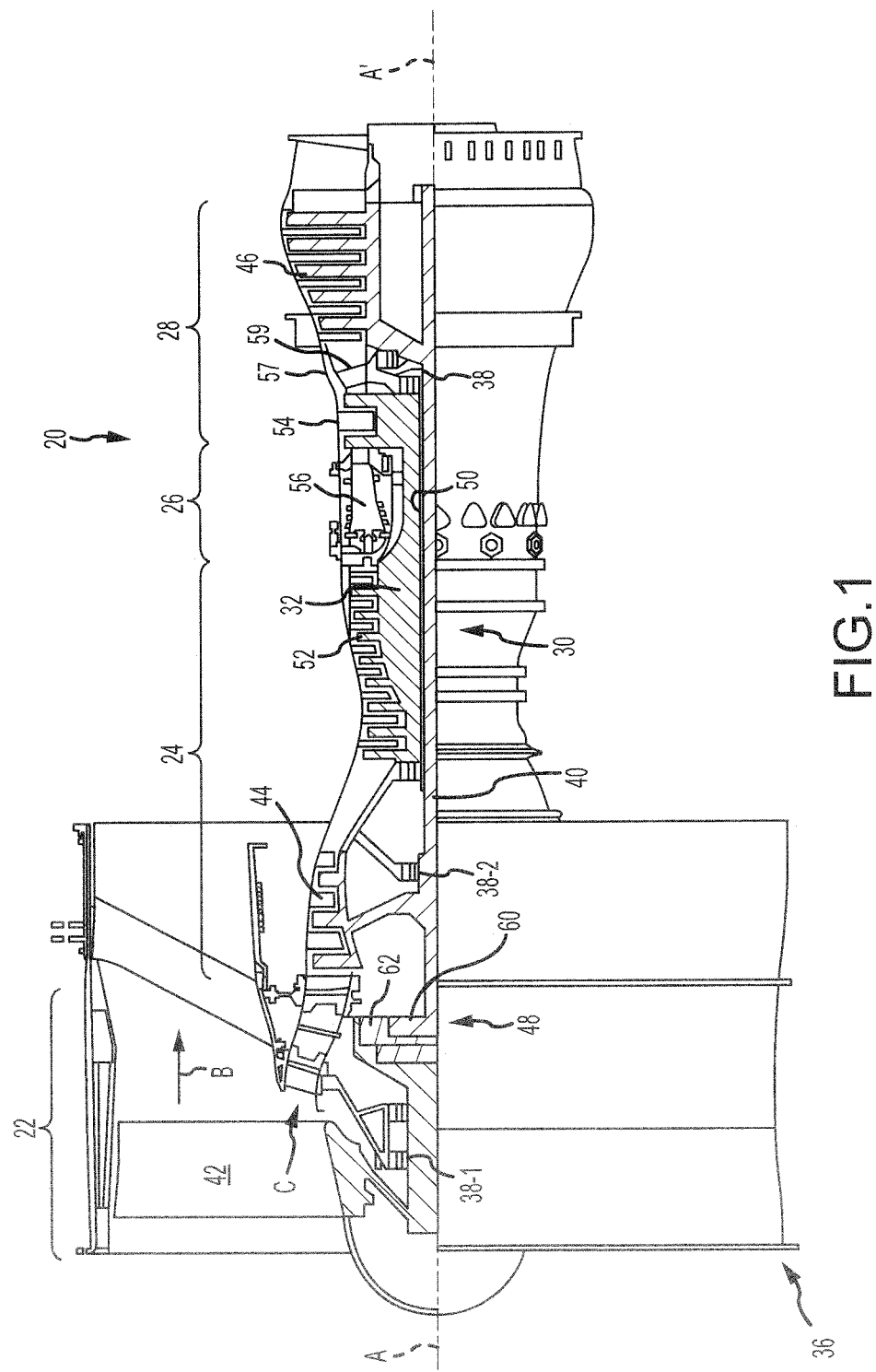
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
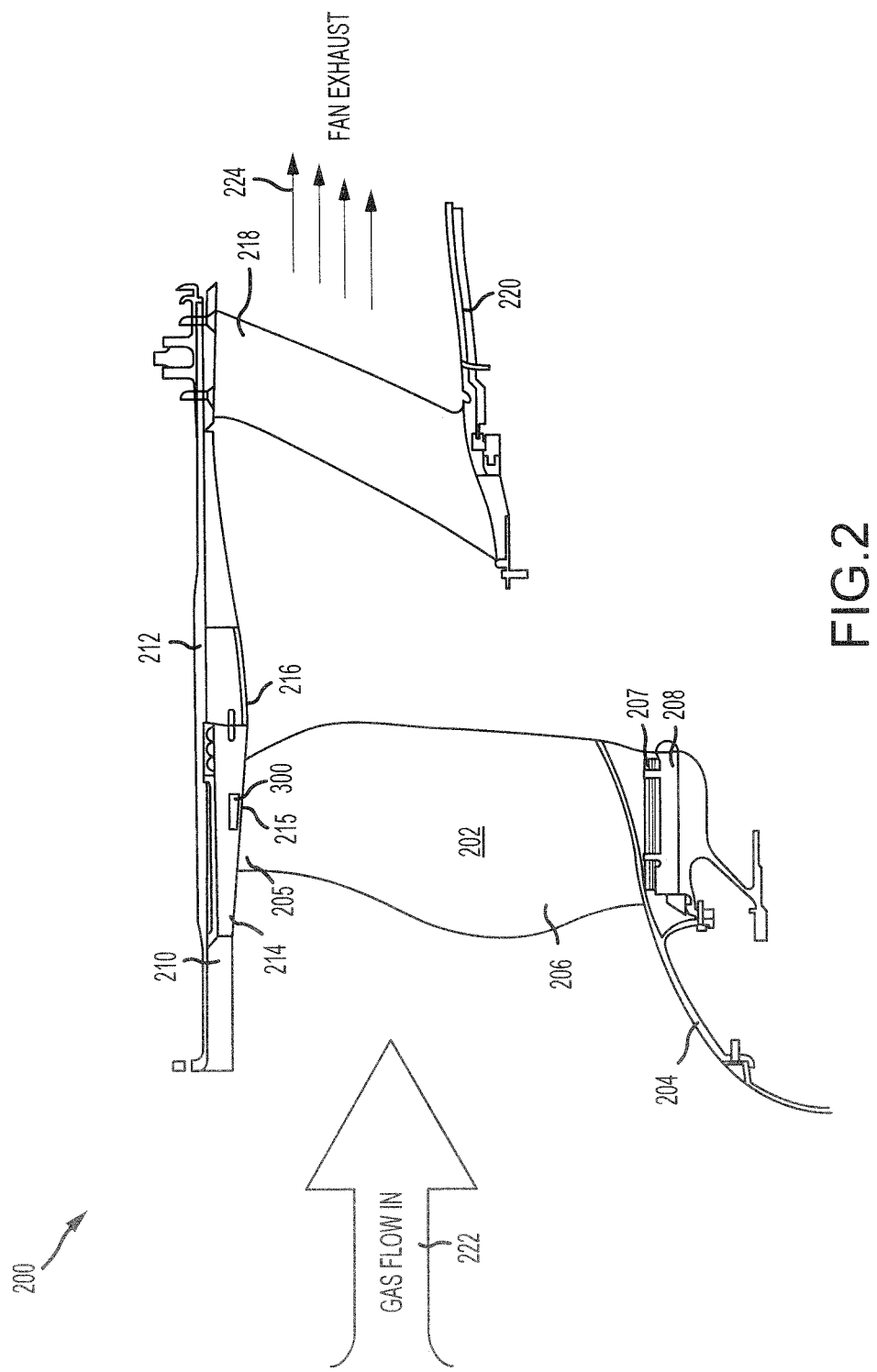
FIG. 2 illustrates a fan section having a fully integral epoxy cap probe, in accordance with various embodiments.

According to various embodiments and with reference to FIGS. 1 and 2, a fan section 200 having a fully integral epoxy cap probe, is provided. Fan 202 comprises blade 206 coupled at blade root 207 to a fan disk 208 and compressor inlet cone 204. Fan 202 may be coupled to a shaft, such as inner shaft 40, where inner shaft 40 may be in mechanical communication with geared architecture 48. Tip 205 of blade 206 lies proximate rub strip 214 which forms a part of the inner aerodynamic surface 216 of fan case 210. A fully integral epoxy cap probe 300 lies radially outward of blade 206 and proximate tip 205 between inner aerodynamic surface 216 and outer casing 212 of fan case 210. Fully integral epoxy cap probe 300 comprises a structural element of rub strip 214 and may be co-molded in part with rub strip 214 or may be embedded within rub strip 214. In various embodiments, fully integral epoxy cap probe 300 may form a portion of inner aerodynamic surface 216. Fan case 210 may be coupled at an aft end to pylon 218 which may be coupled to compressor casing 220. As fan 202 rotates about the shaft it tends to draw in gas 222, such as, for example air, at the fore end of fan case 210. Rotating fan 202 tends to accelerate gas 222 along inner aerodynamic surface 216 toward pylon 218 passing between inner aerodynamic surface 216 and compressor case 220 as fan exhaust 224.

In various embodiments, portion of gas 222 may escape fan 202 by passing over tip 205 through a gap 215 between tip 205 and inner aerodynamic surface 216 tending to decrease efficiency. In various embodiments, the width of gap 215 between tip 205 and inner aerodynamic surface 216 may vary with respect to a position along the chord line of blade 206. The fully integral epoxy cap probe 300 may be located axially (relative to the axis of rotation of fan 202, with momentary reference to A-A' in FIG. 1) within a bounded portion of rub strip 214 bounded at the forward end by a leading edge of blade 206 and at the aft end by a trailing edge of blade 206. In various embodiments, a plurality of sensors may be located axially within the bounded portion of rub strip 214 along the chord of blade 206. In various embodiments, a plurality of sensors may be located circumferentially around fan section 200 within the bounded portion of rub strip 214.

Figure 3:
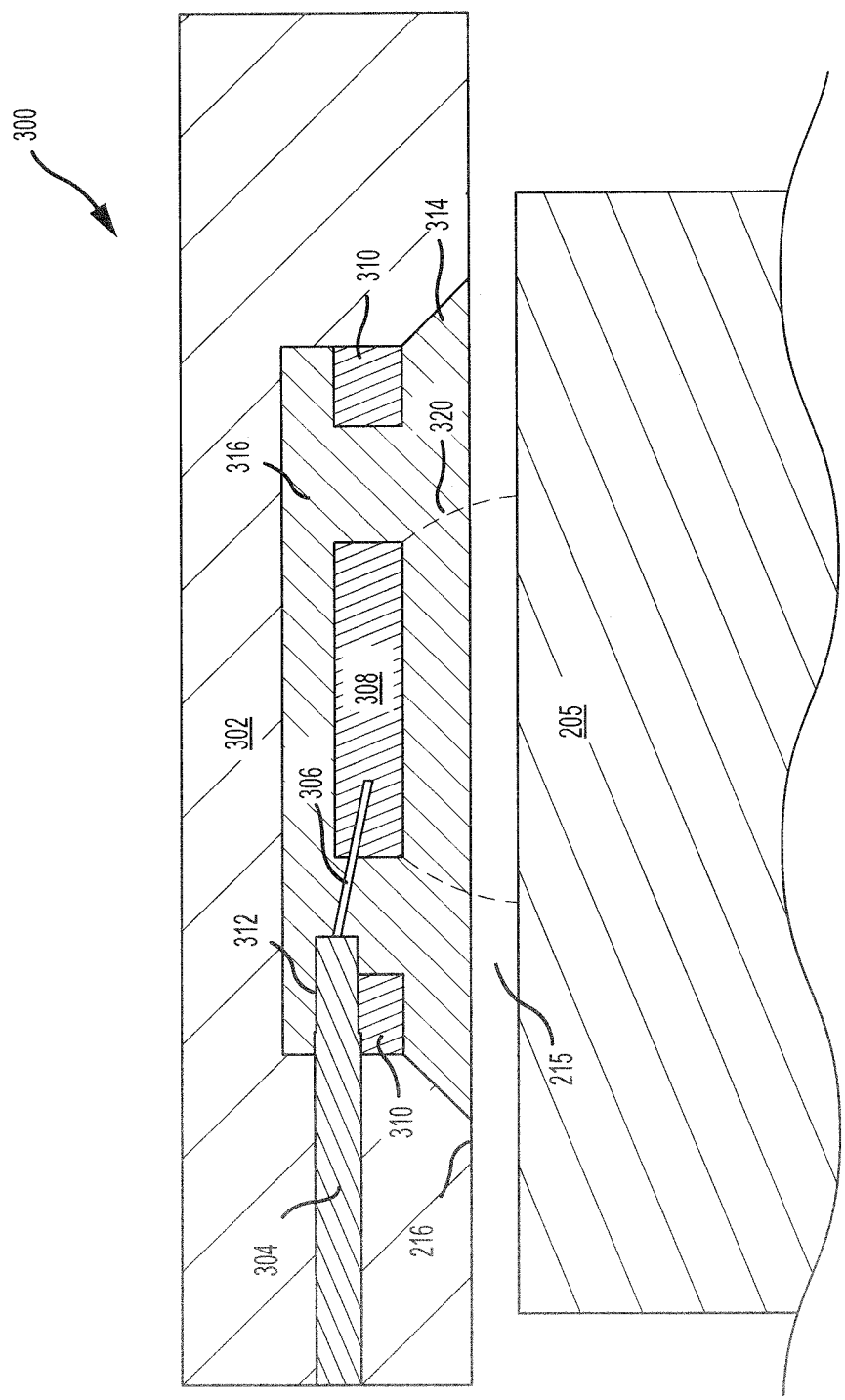
FIG. 3 illustrates a fully integral epoxy cap probe, in accordance with various embodiments.

With additional reference to FIG. 3, a fully integral epoxy cap probe 300 is provided in cross section and comprises a body 302 and a frame 316. In various embodiments, body 302 may comprise a portion of rub strip 214. In various embodiments a first soft lead 304 may be embedded in and/or inserted through body 302 into frame 316. In various embodiments, a soft lead such as first soft lead 304 may be a shield lead and comprise a lead shield 312 such as, for example, a metallic overbraid and a lead wire 306. Lead wire 306 is coupled to and is in electronic communication with sensor element 308. In various embodiments, lead shield 312 is coupled to and in electronic communication with ground plane 310. In various embodiments, lead shield 312 may comprise a conducive metallic foil or overbraid or any other shield known to those skilled in the art, such as, for example, one of an alloy, a copper, an aluminum, or a gold, about the soft lead and in electronic communication with an electrical ground. In various embodiments, ground plane 310 and sensor element 308 are protected by cap 314 which may form a portion of inner aerodynamic surface 216.

In various embodiments, sensor element 308 is energized by lead wire 306 and an electric field flows between sensor element 308 and ground plane 310. As tip 205 of blade 206 passes proximate to sensor element 308, electric field 320 tends to flow across gap 215 into blade tip 205 inducing a capacitance between the blade tip 205 and the sensor element 308 which tends to vary with respect to the width of gap 215. In this regard, the gap between a blade tip and an outer aerodynamic surface may be determined as a function of the change in capacitance occurring at a frequency which is a function of the time the blade tip dwells within the electric field.

Figure 4:
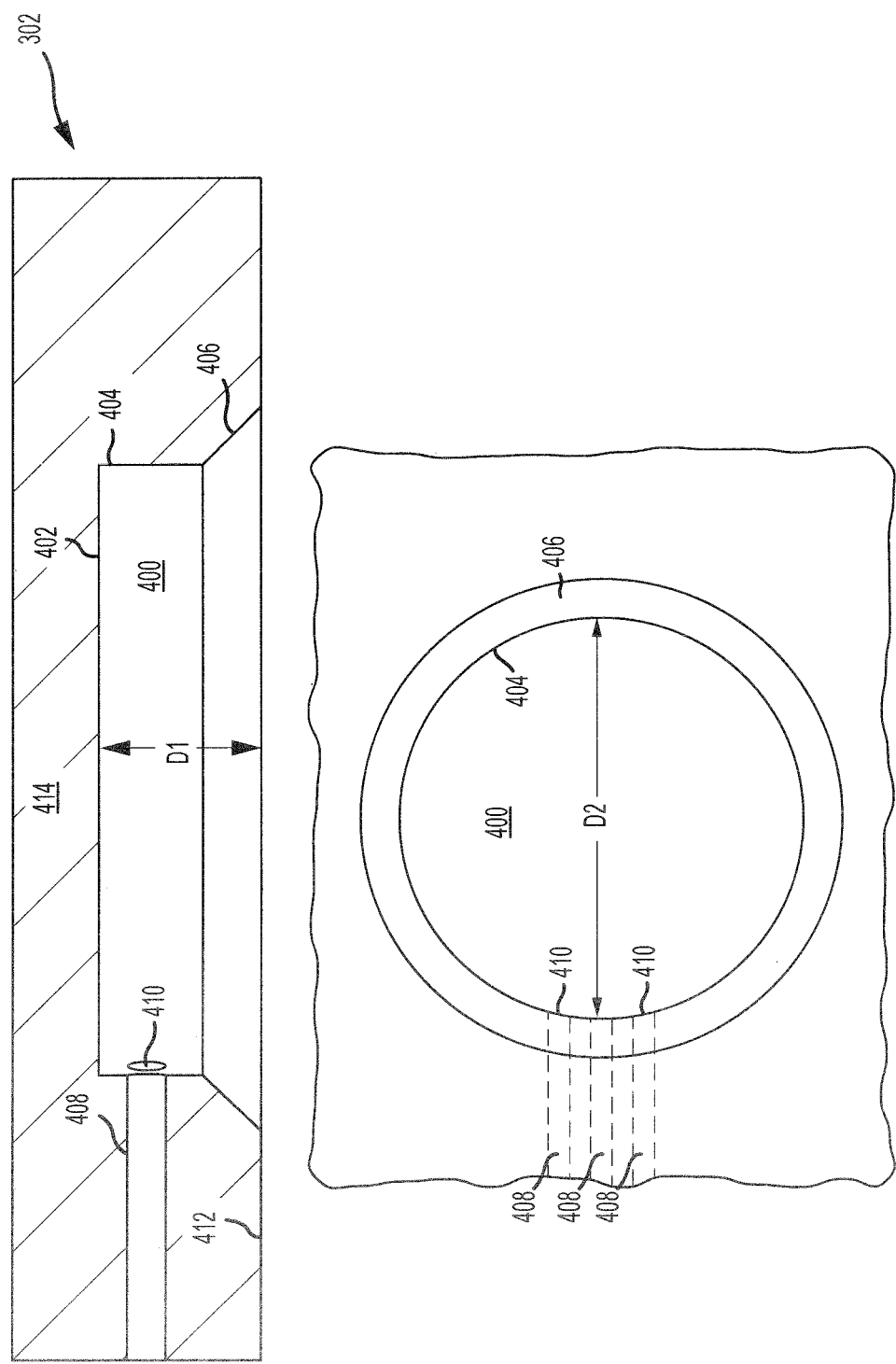
FIG. 4 illustrates a body of a fully integral epoxy cap probe, in accordance with various embodiments.

In various embodiments and with additional reference to FIG. 4, body 302 of fully integral epoxy cap probe 300 is shown in cross-section and in plane with the page looking into a cavity 400. In various embodiments, body 302 comprises cavity 400 having a depth D1 extending from top surface 412 into body material 414 toward floor 402. In various embodiments, top surface 412 may be coplanar with inner aerodynamic surface 216 and D1 may thereby extend radially outward of inner aerodynamic surface 216. In various embodiments, cavity 400 may be bounded by and a sidewall 404 and comprise a chamfer 406 and/or a fillet feature. In various embodiments, cavity 400 may have a diameter D2 and/or width between portions of sidewall 404. In various embodiments, body 302 may comprise passages 408 through body material 414 having an openings 410 into cavity 400 which may be sized to provide ingress for first soft lead 304. In various embodiments passages 408 may comprise a trench cut a depth into body material 414 from top surface 412, or may comprise a tube co-molded with body material 414. In various embodiments opening 410 may be located through chamfer 406, or sidewall 404, or floor 402, or any other location suitable for an ingress of a soft lead. In various embodiments, passages 408 and openings 410 may provide ingress for one or more soft leads.

Figure 5:
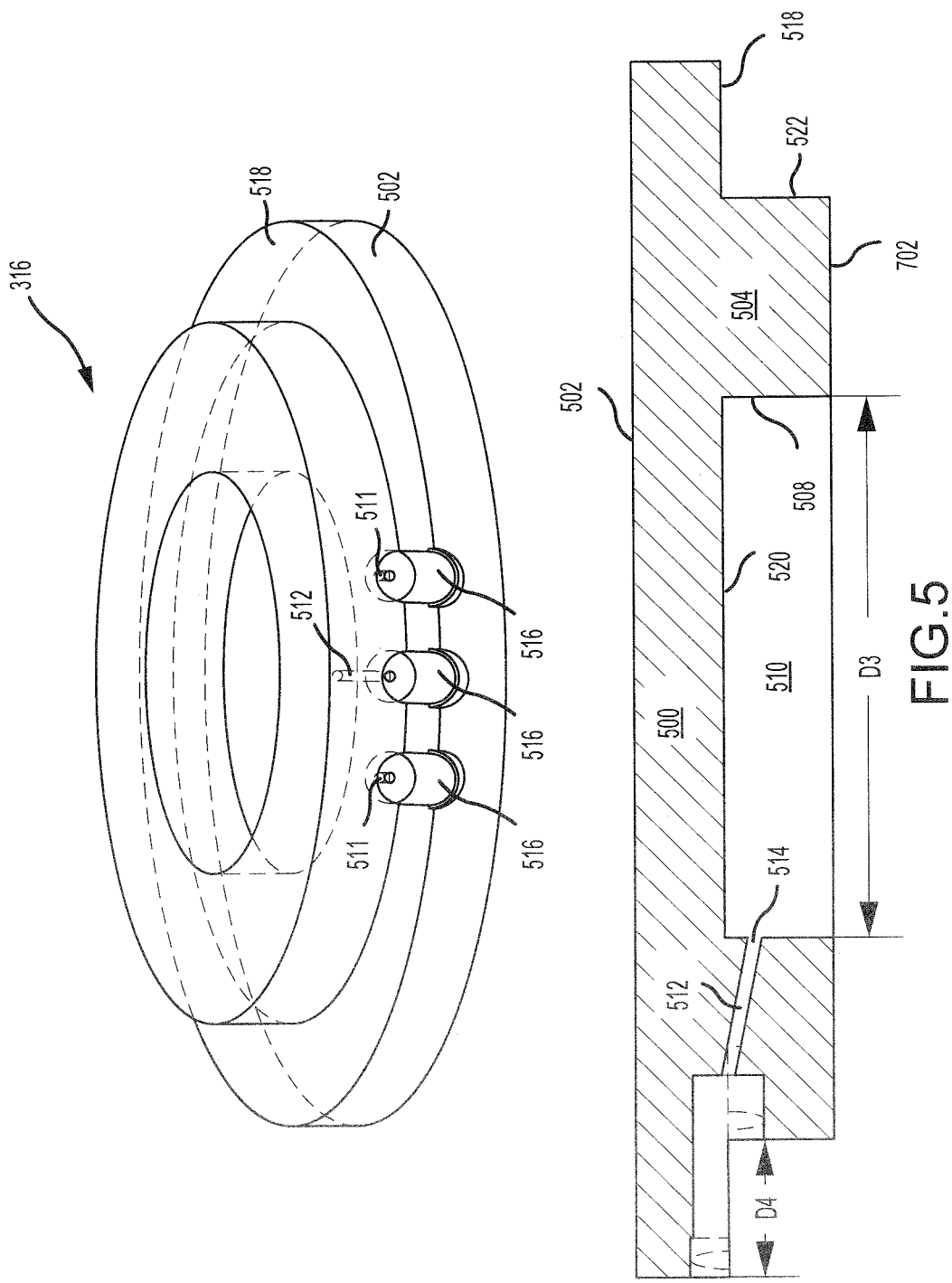
FIG. 5 illustrates a frame of a fully integral epoxy cap probe, in accordance with various embodiments.

In various embodiments, body material 414 may comprise one of a first resin, epoxy, and/or thermoset material and may be interspersed with a fibrous component. In various embodiments, cavity 400 may be formed additively or subtractively or co-molded with body material 414 and may comprise at least one of a circular geometry, a radial geometry, a multi radial or elliptical geometry, or an angular geometry In various embodiments, and with reference now to FIG. 5, frame 316 may comprise a backplane 502 having an enclosing wall 504 extending perpendicular to the plane of the backplane and having an outer face 522 and an inner face 508. In various embodiments, inner face 508 of enclosing wall 504 defines a pocket 510 having a floor 520. In various embodiments, backplane 502 may comprise a disk and enclosing wall 504 may comprise an annular wall. In various embodiments, one or more channels 516 may be cut into upper surface 518 and through outer face 522 and may extend partially or fully through frame material 500 to provide clearance and/or bedding space for soft leads. In various embodiments, channels 516 may further comprise partial passages 511 and/or passage 512 for lead wires and passage 512 may comprise an opening 514 into pocket 510. In various embodiments, opening 510 may be located on inner face 508 of enclosing wall 504, or floor 520, or any other location suitable for an ingress of a lead wire into pocket 510. In various embodiments, a plurality of passages, such as passage 512, and openings, such as opening 514, may provide ingress for one or more lead wires.

In various embodiments, pocket 510 comprises a dimension D3 defined between opposite portions of inner face 508 and upper surface 518 comprises a dimension D4 defined between outer face 522 and a distal edge of backplane 502. In various embodiments, frame 316 may be formed additively or subtractively, or may be molded or cast of frame material 500.

In various embodiments, frame material 500 may comprise at least one of a second resin, epoxy, and/or thermoset material and may be hydrophobic and have dielectric properties. In various embodiments, frame material 500 may have mechanical properties and mechanical performance such as, for example, strength, viscosity, thermal endurance, hardness, abrasion resistance, delamination resistance, and density, substantially similar to body material 414. In various embodiments, frame material 500 may have a porosity (% of water absorption at room temperature) of zero. In various embodiments, the dielectric strength of frame material 500 is greater than 26.6 kV/mm, the volume resistivity at room temperature is greater than $10^{14}$ Ohm-cm and greater than $10^{11}$ at 570° F., and the dielectric constant at room temperature and 8500 MHz is between about 9 where about in this context is ±5.

In various embodiments, frame material 500 comprises a resin composition comprising a diglycidyl ether of bisphenol AF (DIAGRAM 1 below), "bisphenol AF", and at least one diglycidyl ether of bisphenol A and/or bisphenol F, "bisphenol A" and/or "bisphenol F". In various embodiments, the resin composition may comprise a mixture of bisphenol AF with bisphenol A at a mixture ratio of about 10% to about 90% or about 90% to about 10%. In various embodiments, the mixture ratio of bisphenol AF with bisphenol A may be between about 20% to about 80% and about 80% to about 20%, or between about 30% to about 70% and about 70% to about 30%, or between about 40% to about 60% and about 60% to about 40%, or between about 50% to about 50%. In various embodiments, the resin composition may comprise a mixture of bisphenol AF with bisphenol F at a mixture ratio of about 10% to about 90% or about 90% to about 10%. %. In various embodiments, the mixture ratio of bisphenol AF with bisphenol F may be between about 20% to about 80% and about 80% to about 20%, or between about 30% to about 70% and about 70% to about 30%, or between about 40% to about 60% and about 60% to about 40%, or between about 50% to about 50%. In various embodiments, the resin composition may comprise a mixture of bisphenol AF with bisphenol A and bisphenol F at a mixture ratio of about 5% to about 90% and about 1% to about 94% and about 1% to about 94% or about 90% to about 5% and about 94% to about 1% and about 94% to about 1%. In various embodiments, the mixture ratio of bisphenol AF with bisphenol A and bisphenol F may be between about 10% to about 80% and about 10% to about 80% and about 10% to about 80% and about 80% to about 10% and about 80% to about 10% and about 80% to about 10%, or between about 20% to about 60% and about 20% to about 60% and about 20% to about 60% and about 60% to about 20% and about 60% to about 20% and about 60% to about 20%, or between about 30% to about 40% and about 30% to about 40% and about 30% to about 40% and about 40% to about 30% and about 40% to about 30% and about 40% to about 30%. In various embodiments, the resin composition may comprise between 15% and 25% by weight of bisphenol A and/or bisphenol F, between 10% and 20% by weight of Alkyl(C12-14) glycidyl ether, and between 65% and 70% of bisphenol AF.

In various embodiments, the resin composition may be represented by a formula:

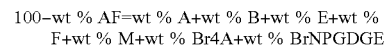    [1]

In Formula 1, wt % indicates the corresponding quantity is a weight percent relative to the total weight of all other resin components; AF represents bisphenol AF, A represents bisphenol A, B represents bisphenol B, E represents bisphenol E (diglycidyl ether of bisphenol E), F represents bisphenol F (diglycidyl ether of bisphenol F), M represents bisphenol M (diglycidyl ether of bisphenol M), Br4A represents tetrabromobisphenol A (diglycidyl ether of tetrabromobisphenol A), and BrNPGDE represents brominated neopently glycol diglycidyl ether; wt % AF is a number in the range from about 10 to about 90, wt % A is a number in the range from 0 to about 90, wt % B is a number in the range from 0 to about 90, wt % E is a number in the range from 0 to about 90, wt % F is a number in the range from 0 to about 90, wt % M is a number in the range from 0 to about 90, wt % Br4A is a number in the range from 0 to about 30, and wt % BrNPGDE is a number in the range from about 10 to about 30. In various embodiments at least one of bisphenol A, bisphenol B, bisphenol E, bisphenol F, bisphenol M, tetrabromobisphenol A, and brominated neopently glycol diglycidyl ether are combined with bisphenol AF in Formula 1. In various embodiments, Formula 1 describes a resin combination, by weight percent of components, comprising bisphenol AF, brominated neopently glycol diglycidyl ether, and at least one of bisphenol A, bisphenol B, bisphenol E, bisphenol F, bisphenol M, or tetrabromobisphenol A. In various embodiments, a resin combination of Formula 1 may comprise one or more or all of bisphenol A, bisphenol B, bisphenol E, bisphenol F, bisphenol M, and Tetrabromobisphenol A.

In various embodiments, the resin composition may be combined with one or more additives to form an epoxy composition. In various embodiments additives may comprise a non-conductive filler composition comprising fillers such as silica (SiO2), silica glass bubbles, glass micro fibers, ground mica micro platelets or nano platelets, or other low density non-conductive fillers and the like. In this regard, an epoxy composition may be tailored to achieve a desired low dielectric constant. In various embodiments, additives may comprise conductivity modifiers such as carbon black (i.e., paracrystalline carbon) and/or silver (i.e. Ag) powder, including Ag nano powder and/or copper powder and/or the like. In this regard, an epoxy composition may be tailored to achieve a desired conductance. In various embodiments, additives may comprise fire resistant components or chain extenders such as brominated aliphatic polyol polyepoxy resins or antimony trioxide and the like. In various embodiments, In various embodiments, additives may comprise dyes or pigments. In various embodiments, an epoxy composition may be combined with a curative or a mixture of curatives such as, for example, an amine curative, a cycloaliphatic polyamine, a polyamide, or an amino amine to form an epoxy.

In various embodiments, a conductivity modifier may comprise at least one of carbon black, graphite flakes, nano powders comprising one of silver, nickel, copper, or aluminum, micro powders comprising one of silver, nickel, copper, or aluminum, or whiskers comprising one of silver, nickel, copper, or aluminum. In various embodiments a mixture of conductivity modifier and a resin composition comprises from 0 to 50 weight percent of the conductivity modifier to the resin composition. In various embodiments a mixture of conductivity modifier and a resin composition comprises between 1 and 50 weight percent of the conductivity modifier, or between 5 and 45 weight percent of the conductivity modifier, or between 10 and 40 weight percent of the conductivity modifier, or between 20 and 30 weight percent of the conductivity modifier.

In various embodiments, the non-conductive filler composition may be represented by a formula:

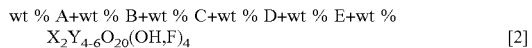

In Formula 2, wt % indicates the corresponding quantity is a weight percent of the non-conductive filler relative to the resin composition; A is selected from at least one of: (SiO2) Silica microparticles, silica nanoparticles, silica flakes or silica whiskers, (Al2O3) Alumina micropoarticles, alumina nanoparticles, alumina flakes or alumina whiskers; wt % A is a number in the range from 0 to about 50; B is selected from at least one of: (SiO4) Quartz microparticles, quartz nanoparticles, quartz flakes or quartz whiskers; wt % B is a number in the range from 0 to about 50; C is selected from at least one of: (TiO2) Titania microparticles, titania nanoparticles, titania flakes or Titania whiskers; wt % C is a number in the range from 0 to about 50; D is selected from at least one of: (BN) Boron nitride platelets, boron nitride flakes, Boron nitride nanomesh, and agglomerations of boron nitride platelets, flakes or nanomesh; wt % D is a number in the range from 0 to about 50; E is selected from at least one of: (AlN)Aluminum nitride micro particles, nanoparticles, flakes or platelets; wt % E is a number in the range from 0 to about 50; X is selected from at least one of: potassium, sodium, or calcium; Y is selected from at least one of: aluminum, magnesium, iron, manganese, chromium, titanium, or lithium; Z is selected from at least one of: silicon or aluminum; and wt % $X_2Y_{4-6}O_{20}(OH,F)_4$ is a number in the range from 0 to about 50. In various embodiments, the non-conductive filler composition may comprise a mixture of at least one of SiO2) Silica microparticles, silica nanoparticles, silica flakes or silica whiskers, (Al2O3) Alumina micropoarticles, alumina nanoparticles, alumina flakes or alumina whiskers, (SiO4) Quartz microparticles, quartz nanoparticles, quartz flakes or quartz whiskers, Titania microparticles, titania nanoparticles, titania flakes or Titania whiskers, (BN) Boron nitride platelets, boron nitride flakes, Boron nitride nanomesh, and agglomerations of boron nitride platelets, flakes or nanomesh, (AlN)Aluminum nitride micro particles, nanoparticles, flakes or platelets, silica glass bubbles, glass micro fibers, or ground mica micro platelets or nano platelets. In various embodiments a mixture of the non-conductive filler relative to the resin composition comprises between 0 and 50 weight percent of non-conductive filler, or between 1 and 50 weight percent of non-conductive filler, or between 5 and 45 weight percent of the non-conductive filler, or between 10 and 40 weight percent of the non-conductive filler, or between 20 and 30 weight percent of the non-conductive filler.

In various embodiments, a fire resistant component comprises at least one of Tetrabromobisphenol A epoxy resin, Brominated neo pentyl glycol epoxy resin, or Antimony trioxide and a mixture of a fire resistant component and the resin composition comprises about 1 to about 30 weight percent Tetrabromobisphenol A epoxy resin to the resin composition or about 1 to about 30 weight percent Brominated neo pentyl glycol epoxy resin to the resin composition or about 1 to about 10 weight percent Antimony trioxide to the resin composition.

In various embodiments, a curative may be selected from at least one of the group of Aliphatic Amines comprising of Diethylene triamine (DTA), Triethylene triamine (TTA), Tetraethylene Pentamine (TEPA), Diproprene diamine (DPDA), Diethyl amino propylamine (DEAPA), or Diethyl amino propylamine (DEAPA), the group of Cycloaliphatic amines comprising of N-aminoethylpiperazine (N-AEP), Menthane diamine (MDA), or Isophoronediamine (IPDA), the group of Aromatic amines comprising of m-xylenediamine (m-XDA), Metaphenylene diamine (MPDA), Diaminodiphenylmethane (DDM), or Diaminodiphenylsulfone (DDS). In various embodiments, one or more Aliphatic, Cycloaliphatic, and/or Aromatic amines may be combined to form a curative mixture. In various embodiments, a curative or a curative mixture is combined with the resin compound such that the number of reactive epoxide groups present in the resin compound formulation is approximately equal to the number of reactive amine functional groups present in the curative or the curative mixture.

In various embodiments, frame material 500 may comprise a first epoxy composition comprising between 40% and 70% by weight of resin composition comprising bisphenol AF diglycidyl ether having fluorinated methyl groups (DIAGRAM 1 below) "bisphenol AF", between 10% and 30% by weight of silica glass, between 10% and 30% by weight brominated aliphatic polyol polyepoxy resin, between 1% and 5% antimony trioxide, and less than 0.1% by weight dye and/or trace reaction products.

DIAGRAM 1

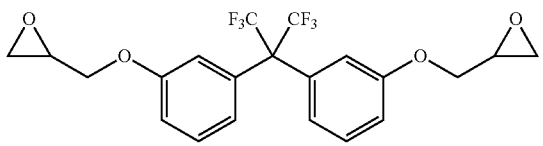

Figure 6A:
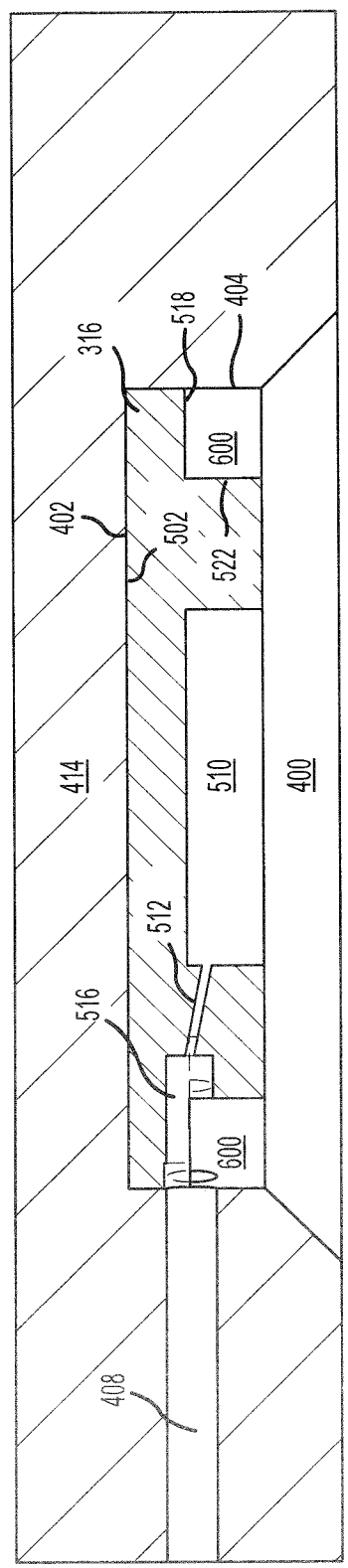
FIG. 6A illustrates a frame within a body of a fully integral epoxy cap probe, in accordance with various embodiments.
Figure 6B:
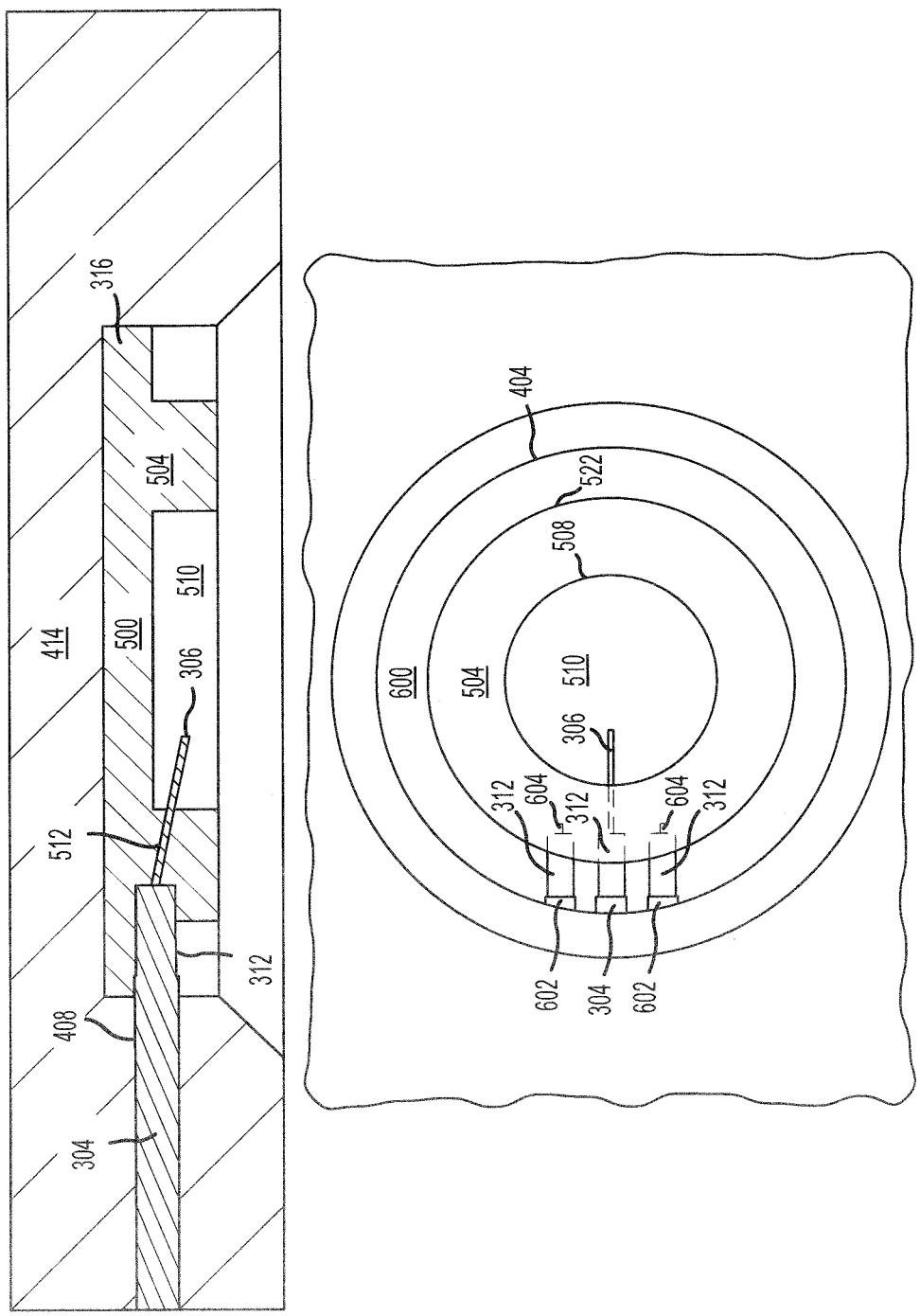
FIG. 6B illustrates a frame within a body of a fully integral epoxy cap probe, in accordance with various embodiments.

With additional reference FIGS. 6A and 6B, in various embodiments frame 316 is inserted into cavity 400 with backplane 502 in contact with the floor 402 of cavity 400. In various embodiment, a trench 600 is defined by upper surface 518, outer face 522, and sidewall 404. Channels 516 and passages 408 are aligned and first soft lead 304 and calibration soft leads 602 are inserted into passages 408 and across trench 600 and into channels 516 with lead shields 312 exposed and open to trench 600. Lead wire 306 is inserted through passage 512 and opening 514 into pocket 510, and calibration lead wires 604 are inserted into partial passages 511 and in electronic communication with frame material 500. In various embodiments, frame 316 may be partially cured and may be coupled to body material 414 in response to a curing process. In various embodiments, frame 316 may be coupled by an adhesive bond.

With additional reference to FIG. 7 and in various embodiments, pocket 510 and trench 600 are filled with a conductive material 700 comprising an electrically conductive and hydrophobic third resin, epoxy, and/or thermoset material. In various embodiments, conductive material 700 has a resistivity not more than $10^{-7}$ Ohm-m. Conductive material 700 disposed in trench 600 is in electronic communication with lead shields 312. Conductive material 700 disposed in pocket 510 forms sensor element 308 and is electronically coupled to lead wire 306. In various embodiments, conductive material 700 may be partially cured and is adhesively coupled between lead shields 312, frame 316, and body material 414 and adhesively coupled to lead wire 306 and pocket 510. In various embodiments, surfaces 702 of conductive material 700 (comprising sensor element 308 and ground plane 310) and frame material 500 (comprising enclosing wall 504) may be machined substantially smooth or coplanar after partial curing. In various embodiments, additional frame material 500 may be added to fill a remaining space of cavity 400 about chamfer 406 to form cap 314 (recall FIG. 3) over frame 316 and conductive material 700 tending thereby protect ground plane 310 and sensor element 308.

In various embodiments, conductive material 700 may comprise at least one of a third resin, epoxy, and/or thermoset material and may be hydrophobic and have conductive properties. In various embodiments, conductive material 700 may have mechanical properties such as, for example, strength, viscosity, thermal endurance, hardness, abrasion resistance, and density, substantially similar to body material 414. In various embodiments, conductive material 700 may have a porosity (% of water absorption at room temperature) of zero.

In various embodiments, conductive material 700 may comprise the resin composition comprising bisphenol AF resin (DIAGRAM 1 above) and at least one of bisphenol A resin and/or bisphenol F resin as described above with regard to the frame material 500.

In various embodiments, conductive material 700 may comprise a second epoxy composition comprising between 40% and 70% by weight of resin composition comprising bisphenol AF diglycidyl ether having fluorinated methyl groups (DIAGRAM 1 above) "bisphenol AF", between 0% and 30% by weight of silica glass, between 10% and 30% by weight of carbon black and/or silver powder, between 10% and 30% by weight brominated aliphatic polyol polyepoxy resin, between 1% and 5% antimony trioxide, and less than 0.1% by weight dye and/or trace reaction products.

In various embodiments the materials comprising a fully integral epoxy cap probe, such as body material 414, frame material 500, and conductive material 700, may be cured under pressure or vacuum or heat treated to activate the adhesive property of the material, such as, for example by curing in an autoclave. In various embodiments, a fully integral epoxy cap probe may be cured simultaneously with a rub strip such as, for example, rub strip 214. In various embodiments a fully integral epoxy cap probe may be cured independently and bonded to the rub strip. In various embodiments, the materials may be partially cured in sequence then be fully cured integrating the materials, such as, for example, body material 414, frame material 500, and conductive material 700, as a monolithic or contiguous solid material embedding soft leads, such as first soft lead 304 and calibration soft leads 602, therein. In various embodiments, a cap, such as cap 314, may be machined to an aerodynamic surface, such as inner aerodynamic surface 216, once fully cured.

Figure 8:
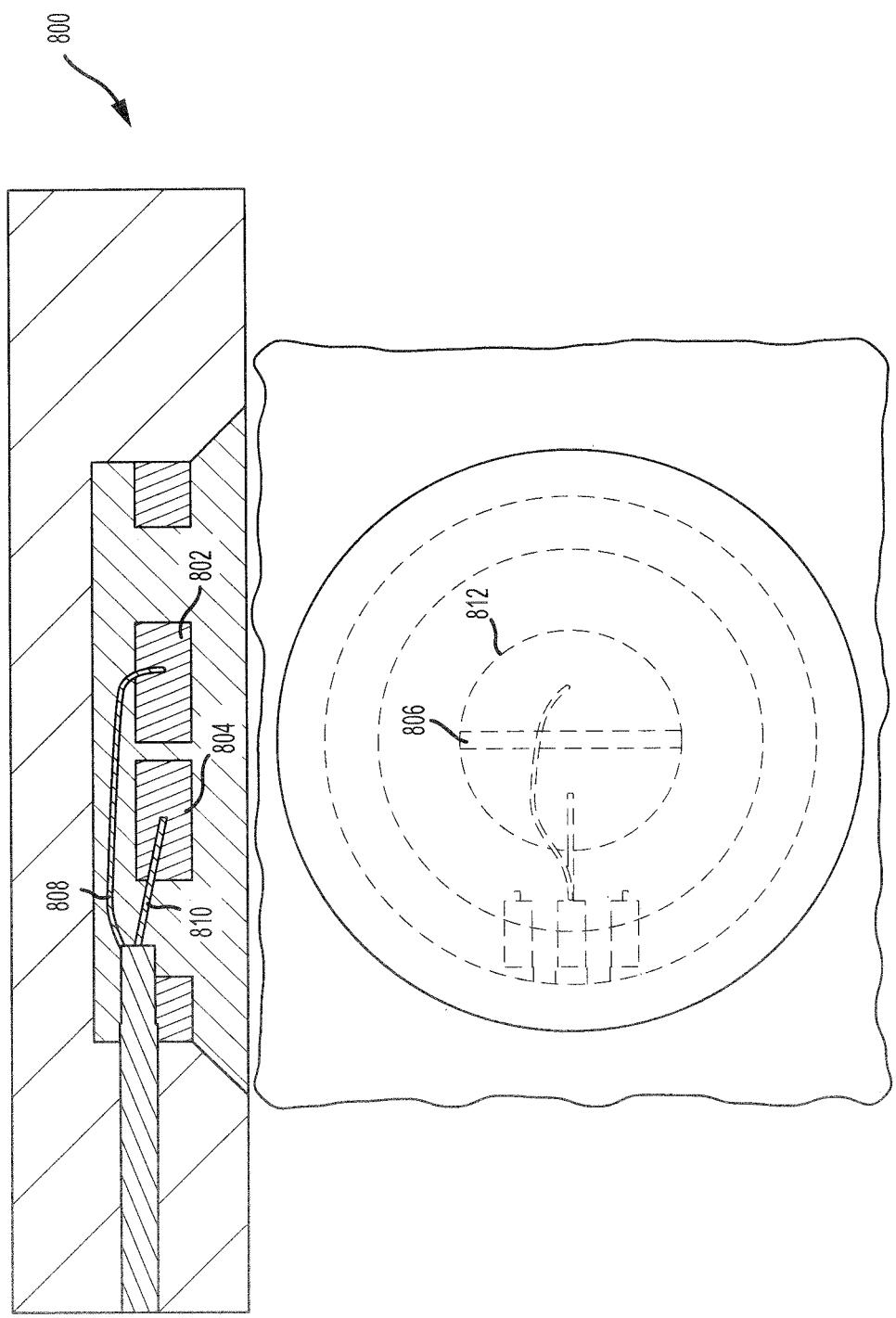
FIG. 8 illustrates a fully integral epoxy cap probe, in accordance with various embodiments.

In various embodiments, and with reference now to FIG. 8, a fully integral epoxy cap probe 800, is provided. Fully integral epoxy cap probe 800 comprises features, materials, geometries, manufacturing techniques, and/or internal components similar to fully integral epoxy cap probe 300 of FIGS. 2-7. Pocket 812 is divided by pocket wall 806 forming a first sensor element 802 and a second sensor element 804. First sensor element 802 is energized by a first lead wire 808 and second sensor element 804 is energized by a second lead wire 810. In various embodiments, as a tip of a blade, such as tip 205 of blade 206, passes proximate to first sensor element 802 and second sensor element 804, an electric field tends to flow across a gap, such as gap 215, into the blade tip inducing a capacitance between the blade tip and the first sensor element 802 and second sensor element 804 which tends to vary with respect to the width of the gap and the time of the blade pass. In this regard, the gap between a blade tip and an outer aerodynamic surface and the timing of the blade pass may be determined as a function, relative to first sensor element 802 and second sensor element 804, of the change in capacitance occurring at a frequency which is a function of the time the blade tip dwells in the electric field of the first sensor element or the second sensor element.

Figure 9:
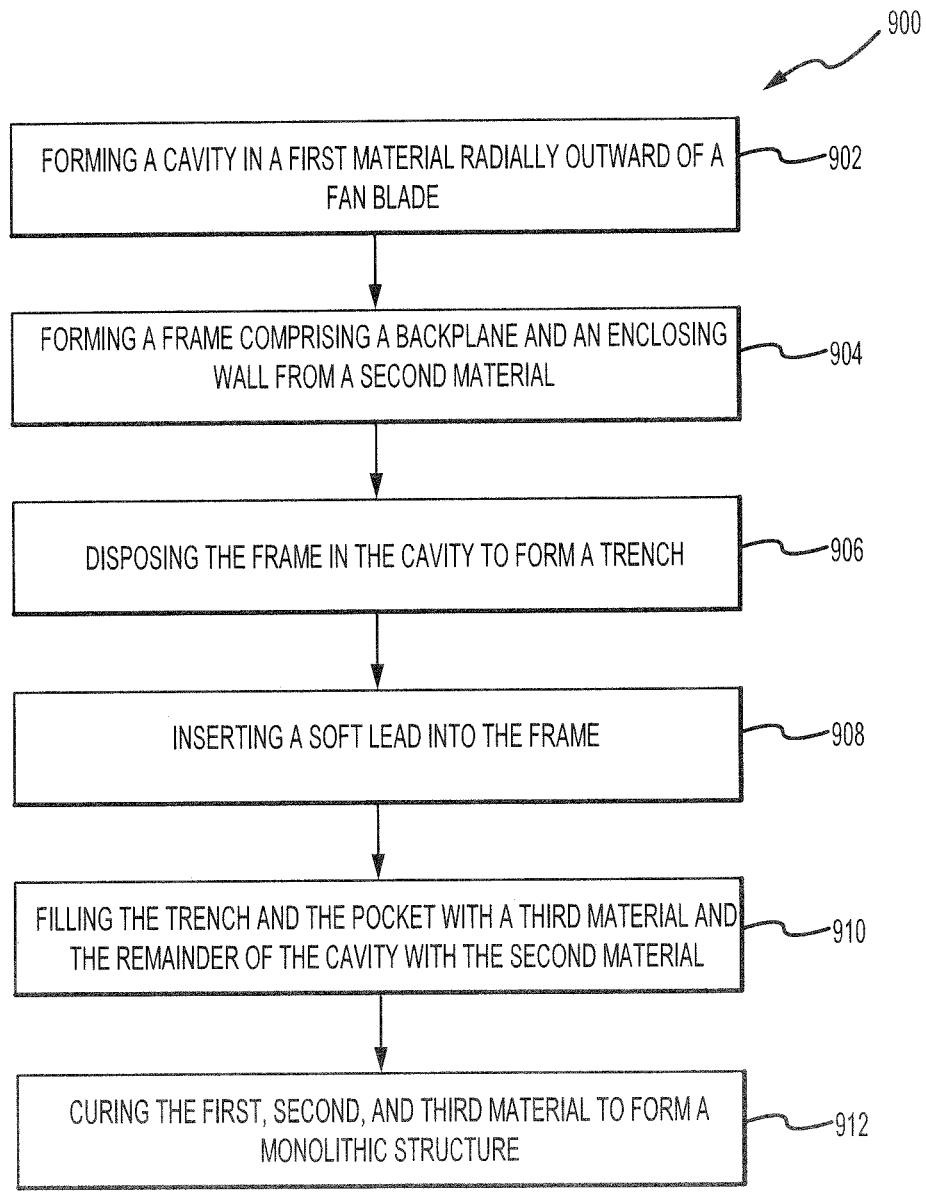
FIG. 9 illustrates a method of manufacturing a fully integral epoxy cap probe, in accordance with various embodiments.

In various embodiments and with reference now to FIG. 9, a method 900 of fabricating a fully integral epoxy cap probe may comprise forming a cavity 902 having a sidewall in a first material radially outward of a fan blade. The method may further comprise forming a frame comprising a backplane and an enclosing wall 904, the enclosing wall extending perpendicular to the back plane and defining a pocket radially inward of the enclosing wall, wherein the frame comprises a second material and disposing the frame in the cavity such that the enclosing wall and the sidewall form a trench 906 between the sidewall and the enclosing wall radially outward of the enclosing wall. The method may further comprise inserting a soft lead comprising a lead wire and a lead shield into the frame 908 wherein the lead shield is disposed within the trench and the lead wire is disposed within the pocket, filling the trench and the pocket with a third material and filling a remainder of the cavity with the second material 910, and curing the first material, the second material, and the third material to form a monolithic structure 912.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A curable epoxy resin composition, comprising:
    between 40% and 70% by weight of a resin composition;
    a curative;
    an additive;
    between 10% and 30% by weight of a brominated fire resistant epoxy resin;
    between 1% and 5% by weight of antimony trioxide, and less than 0.1% by weight of dye and/or trace reaction products;
    wherein the resin composition comprises a diglycidyl ether of bisphenol AF, represented by formula (1):

DIAGRAM 1

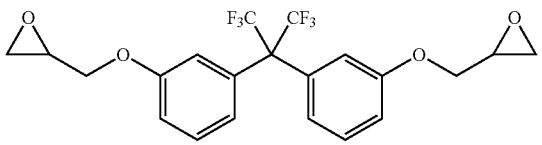

wherein the additive is selected from the group consisting of a non-conductive additive and a conductive additive;
    wherein the non-conductive additive consists of a non-conductive filler composition, provided in an amount of between 10% and 30% by weight of the curable epoxy resin composition; and
    wherein the conductive additive consists of a conductivity modifier, provided in an amount between 10% and 30% by weight of the curable epoxy resin composition, and an optional non-conductive filler composition, provided in an amount of up to 30% by weight of the curable epoxy resin composition.

2. The curable epoxy resin composition of claim 1, wherein the resin composition further comprises a diglycidyl ether of at least one of bisphenol A and bisphenol F.

3. The curable epoxy resin composition of claim 2, wherein the resin composition comprises between 10% to 90% by weight of the diglycidyl ether of bisphenol AF and between 90% to 10% by weight of the diglycidyl ether of bisphenol A, based on the weight of the resin composition.

4. The curable epoxy resin composition of claim 2, wherein the resin composition comprises between 10% to 90% by weight of the diglycidyl ether of bisphenol AF and between 90% to 10% by weight of the diglycidyl ether of bisphenol F, based on the weight of the resin composition.

5. The curable epoxy resin composition of claim 2, wherein the resin composition comprises between 15% and 25% by weight of the diglycidyl ether of at least one of bisphenol A and bisphenol F, between 10% and 20% by weight of a $C_{12}$-$C_{14}$ alkyl glycidyl ether, and between 65% and 70% by weight of the diglycidyl ether of bisphenol AF, based on the weight of the resin composition.

6. The curable epoxy resin composition of claim 2, wherein the brominated fire resistant epoxy resin comprises at least one of a brominated aliphatic polyol polyepoxy resin, a tetrabromobisphenol A epoxy resin, and a brominated neo pentyl glycol epoxy resin.

7. The curable epoxy resin composition of claim 2, wherein the additive is the non-conductive additive.

8. The curable epoxy resin composition of claim 2, wherein the curative comprises at least one of an aliphatic amine, a cycloaliphatic amine, and an aromatic amine.

9. The curable epoxy resin composition of claim 1, wherein the conductivity modifier comprises at least one of carbon black, graphite flakes, silver nanopowders, nickel nanopowders, copper nanopowders, aluminum nanopowders, silver micropowders, nickel micropowders, copper micropowders, aluminum micropowders, silver whiskers, nickel whiskers, copper whiskers, and aluminum whiskers.

10. The curable epoxy resin composition of claim 1, wherein the non-conductive filler composition of the non-conductive additive and the conductive additive comprises at least one of silica, alumina, quartz, titania, boron nitride, aluminum nitride, silica glass bubbles, glass micro fibers, ground mica micro platelets, and ground mica nano platelets;
    wherein the silica, alumina, quartz, and titania are in the form of microparticles, nanoparticles, flakes, or whiskers;
    wherein the boron nitride is in the form of platelets, flakes, nanomesh, agglomerates of platelets, agglomerates of flakes, or agglomerates, of nanomesh; and
    wherein the aluminum nitride is in the form of microparticles, nanoparticles, flakes, or platelets.

11. The curable epoxy resin composition of claim 1, wherein the additive is the conductive additive.

12. An article comprising:
  a frame structure having a frame material comprising a cured product of a first curable epoxy resin composition; and
  a sensor element disposed within the frame structure comprising a cured product of a second curable epoxy resin composition;
  wherein the first curable epoxy resin composition is the curable epoxy resin composition of claim 1 comprising the non-conductive additive; and
  wherein the second curable epoxy resin composition is the curable epoxy resin composition of claim 1 comprising the conductive additive.

13. The article of claim 12, wherein the resin composition of the first curable epoxy resin composition and the resin composition of the second curable epoxy resin composition further comprises a diglycidyl ether of at least one of bisphenol A and bisphenol F.

14. The article of claim 13, wherein the resin composition of the first curable epoxy resin composition and the resin composition of the second curable epoxy resin composition comprises between 15% and 25% by weight of the diglycidyl ether of at least one of bisphenol A and bisphenol F, between 10% and 20% by weight of a $C_{12}$-$C_{14}$ alkyl glycidyl ether, and between 65% and 70% by weight of the diglycidyl ether of bisphenol AF, based on the weight of the resin composition.

15. The article of claim 14, wherein the cured product of the second curable epoxy resin composition has a resistivity not more than $10^{-7}$ Ohm-m.

16. The article of claim 14, wherein the cured product of the first curable epoxy resin composition has a dielectric strength greater than 26.6 kV/mm, a volume resistivity at room temperature greater than $10^{14}$ Ohm-cm, a volume resistivity at 570° F. of greater than $10^{11}$ Ohm-cm, and a dielectric constant at room temperature and 8500 MHz of 9±5.

17. The article of claim 14, wherein the cured product of the first curable epoxy resin composition and the cured product of the second curable epoxy resin composition have a porosity of zero.

* * * * *